April 8, 1930.　　　C. W. ANDERSON　　　1,753,194

STEERING RANGE FOR AUTOMOBILES

Filed March 22, 1929　　　2 Sheets-Sheet 1

Inventor

Charles W. Anderson

By Bates, Golrick & Teare
Attorneys

April 8, 1930.  C. W. ANDERSON  1,753,194
STEERING RANGE FOR AUTOMOBILES
Filed March 22, 1929  2 Sheets-Sheet 2

Inventor
Charles W. Anderson
By Bates, Golrick & Teare
Attorneys

Patented Apr. 8, 1930

1,753,194

UNITED STATES PATENT OFFICE

CHARLES W. ANDERSON, OF MILAN, OHIO

STEERING RANGE FOR AUTOMOBILES

Application filed March 22, 1929. Serial No. 349,065.

This invention relates to steering range devices which are used as sighting points on motor vehicles for enabling the driver to keep the vehicle in a straight path while passing another vehicle. Devices of this kind are particularly useful for night driving as they enable the driver to determine safely the car limits of an approaching vehicle, and thus allow one vehicle to pass another without materially slackening the speed. I have found that in using a device of this character, it is highly desirable that adequate illumination be provided for the right hand edge of the road, and that the front of the vehicle be illuminated on the left hand side to facilitate the car limits of the driver of an approaching vehicle, without causing an objectionable glare to the driver of an approaching vehicle.

The principal object of the present invention is to make a steering range device which will enable the driver to have a sighting point in the direct line of the straight ahead vision, and to provide for adequate illumination in front of the vehicle and particularly on the left hand portion, and yet to provide illumination in the nature of spot light for the right hand edge of the road. My invention contemplates these features by means of a single lamp, as will hereinafter be described.

Figure 1:
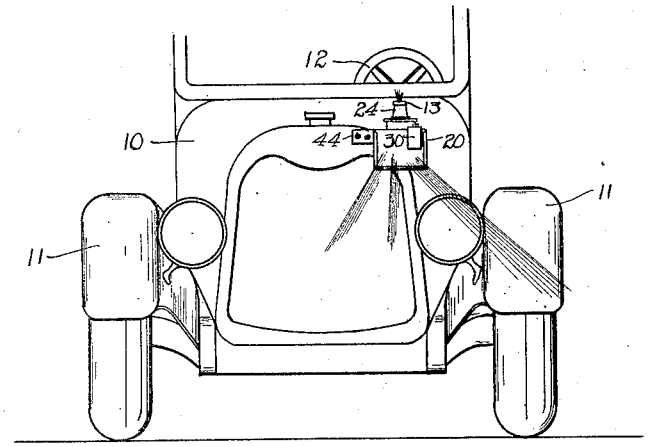
Figure 2:
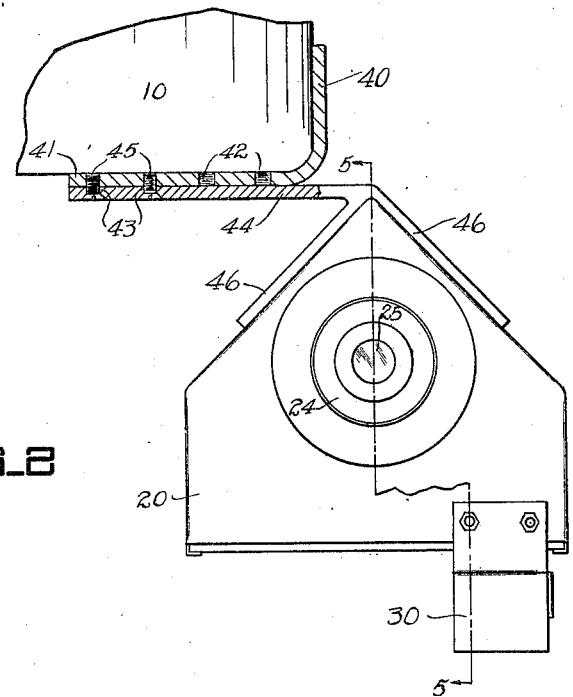
Figure 3:
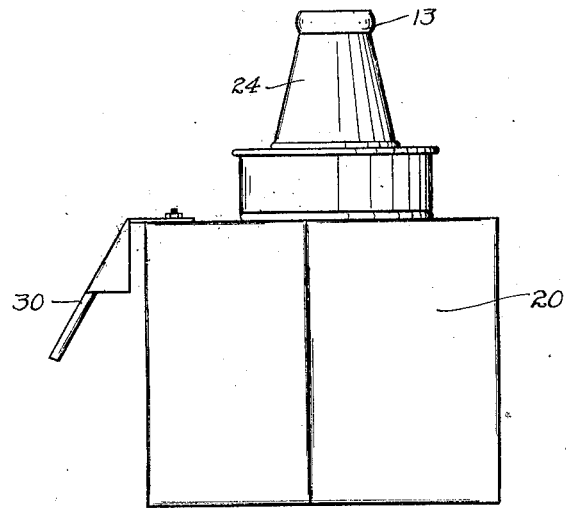
Figure 4:
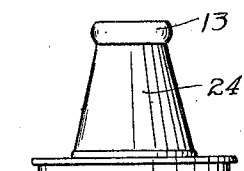
Figure 5:
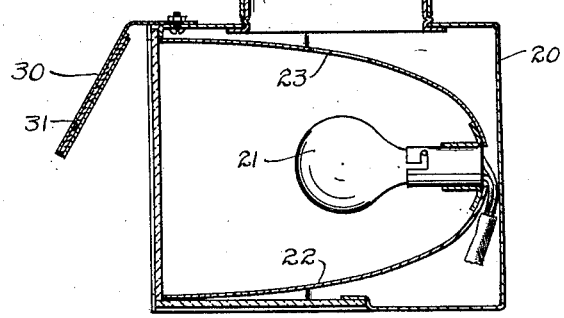

In the drawings, Fig. 1 is a front view of a motor vehicle having a steering range embodying the features of my invention; Fig. 2 is a top plan view of the steering range on an enlarged scale; Fig. 3 is a side elevation; Fig. 4 is a front elevation of the same, and Fig. 5 is a vertical section taken longitudinally through the device on the line 5—5 in Fig. 2.

Referring now to the drawings by reference characters, 10 indicates the hood of an automobile having the usual fenders 11 and steering wheel 12. The steering range is mounted at the forepart of the hood and substantially directly in line with the center of the steering wheel. For best results, I have found that the top of the steering range indicated at 13 should be sufficiently high to afford a sighting point on the road about a hundred feet ahead of the vehicle. A number of vehicles on the market at the present time would accomplish this result if the top of the steering range were on a line with the crown portion of the hood.

The steering range which I have shown preferably comprises a casing 20 which has a lamp 21, and a reflector 22 mounted therein. The candle power of the lamp and reflector arrangement are sufficient in size and construction to constitute a spotlight, the rays of which are directed in front of the vehicle and particularly along the right hand edge of the road.

To provide illumination for the sighting point, I have shown an aperture 23 in the top of the reflector and I have shown the sighting point, as comprising a hollow member 24 which may form a part of the casing 23 or may be separably mounted thereon. In either event, the top of the sighting member has an aperture 25 through which a small beam of light is emitted when the lamp is lit. A glass plate 26 prevents seepage of rainwater into the casing.

To insure adequate illumination of the front of the vehicle, I have shown a deflector 30 which extends forwardly and downwardly from the top casing, and which functions in a satisfactory manner to reflect part of the rays downwardly and laterally of the vehicle front. In the preferred arrangement, the deflector has a highly polished surface, such as a mirror on the inner side thereof. In the referred arrangement, the mirror is tilted to direct most of the light rays striking it toward the left of the vehicle. The net result of this arrangement is that the left hand limits of the vehicle are defined to the driver of an approaching vehicle, and yet the the direct rays are shielded from view. On the other hand, the rays which are not reflected by the surface member 31 are directed forwardly and are sufficient to provide spot light illumination for the right hand edge of the road. This may be accomplished by stopping the edge 31 of the deflector short of the center of the lamp axis.

The advantage of this invention is that I utilize a single lamp as the sighting member for steering purposes, and also for purposes of illumination, without obstructing the vision of the driver of an approaching vehicle. A satisfactory way of fastening the lamp to a vehicle is to utilize an L-shaped member, one arm 40, of which is fastened to the side of the hood, and the other arm 41 of which extends in front of the hood and has threaded openings 42 therein at spaced intervals. Other openings 43 are then made in a bracket 44 and such openings are intended to be brought into registration with those on the arm 41. Suitable securing members 45 then hold the arm 44 in place. The arm 44 extends to the left of the hood and may have an arm 46 at the end thereof for engaging the walls of the casing 20. These arms are then fastened to the casing in any suitable way. Thus the casing may be adjusted laterally to bring the sighting point into the direct normal line of straight ahead vision.

I claim:

1. In combination, a motor vehicle, having a hood and a steering wheel, a lamp casing mounted adjacent the forward and upper part of the hood and substantially in alignment with the center of the steering wheel, said casing having a reflector therein, a lamp positioned within the casing, a reflector having an opening directly above the lamp, and said casing having a hollow extension projecting upwardly therefrom, and having an opening at the top thereof whereby light may be emitted vertically from said extension, a lense carried by the casing at the forward end of said reflector, and a shield carried by the casing outside the lens and acting to direct some of the rays of light downwardly and across the front of the hood.

2. In combination, a motor vehicle, having a hood, a lamp casing, means for mounting the casing upon the forward and upper end of the hood and adjacent one corner thereof, a lamp within the casing, a reflector associated with the lamp, and adapted to emit light rays forwardly of the casing, said casing having a hollow extension projecting vertically thereof, said reflector having an opening therein directly above the lamp and functioning to emit rays into the extension, and said extension being arranged to emit rays at the upper end thereof vertically from the casing, and a shield carried by the casing, and extending downwardly at the forward end and at one side thereof for directing part of the rays downwardly and across the front of the hood.

In testimony whereof, I hereunto affix my signature.

CHARLES WM. ANDERSON.